Patented Aug. 6, 1946

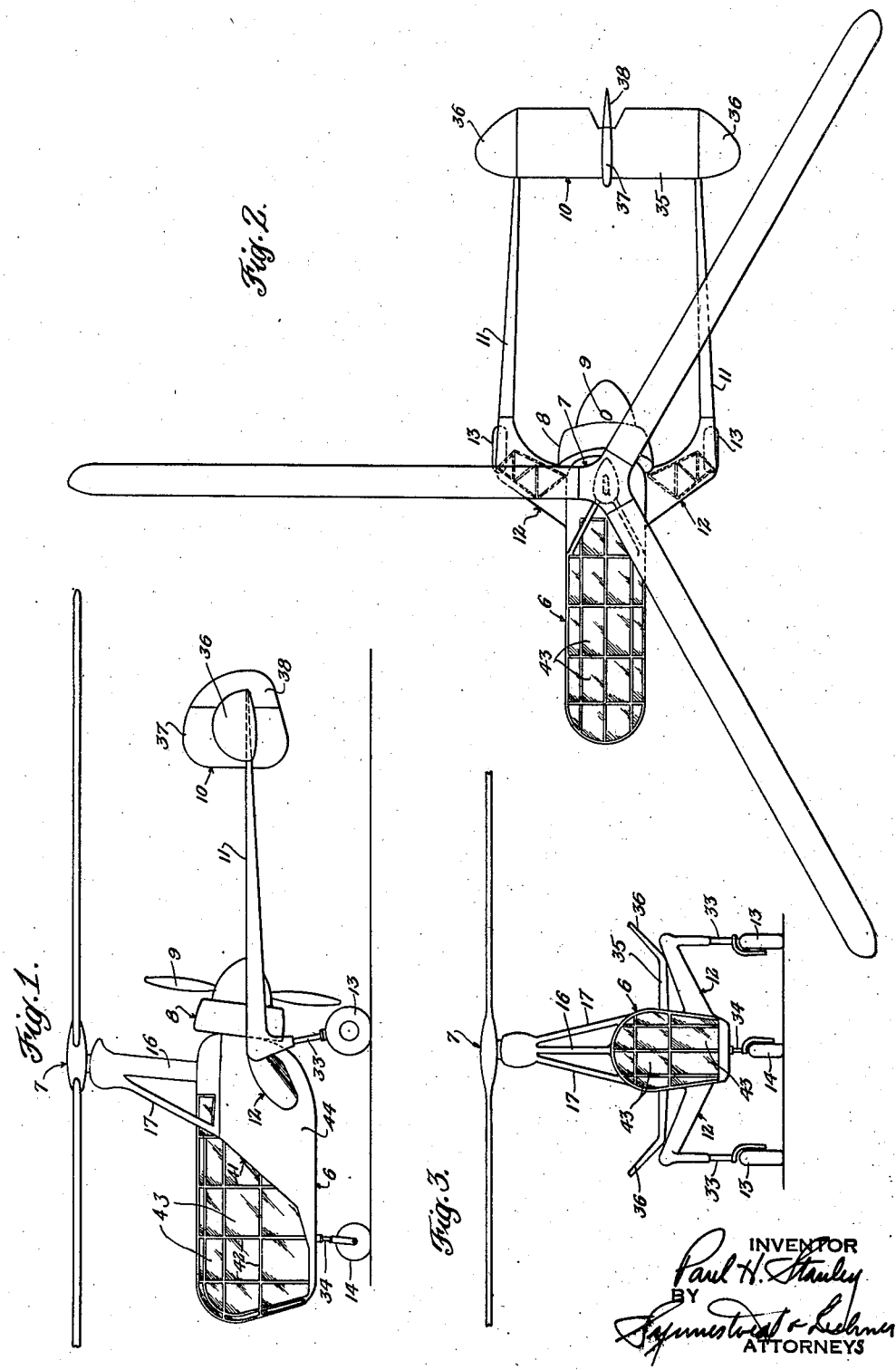

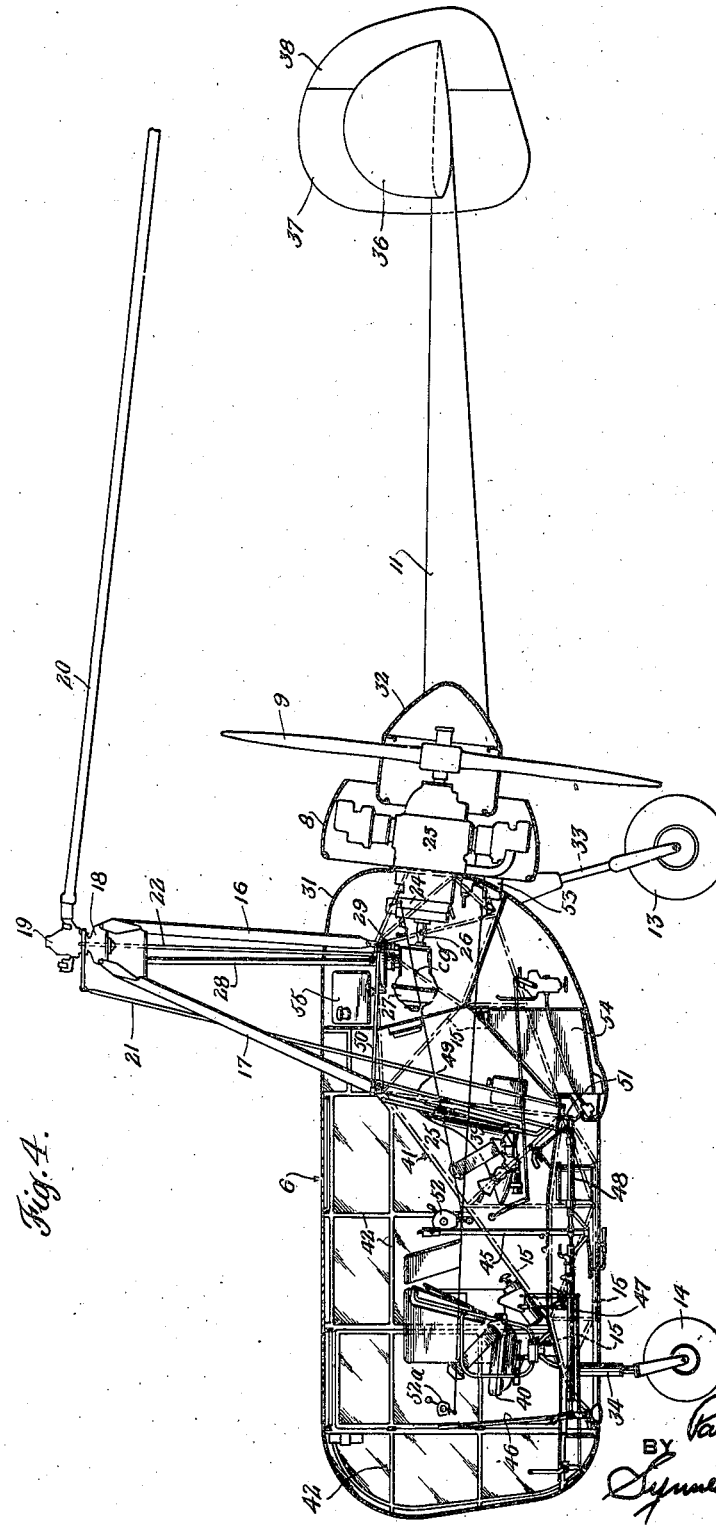

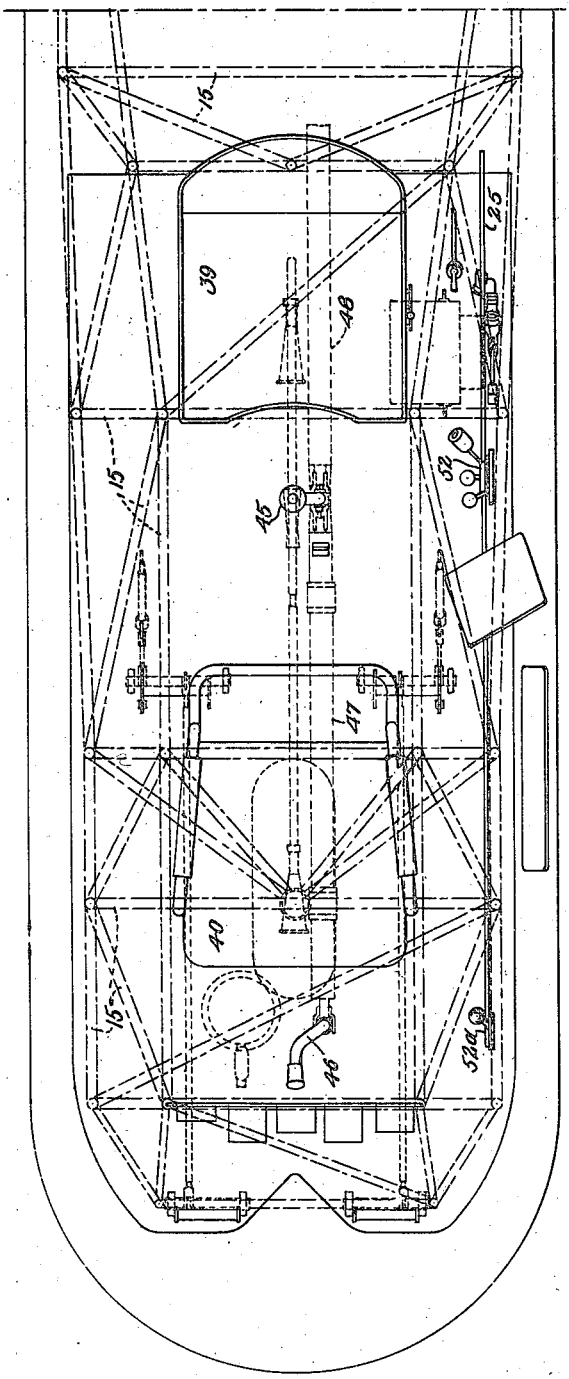

2,405,244

UNITED STATES PATENT OFFICE 2,405,244

ROTARY WING AIRCRAFT

Paul H. Stanley, Huntingdon Valley, Pa., assignor to Autogiro Company of America, Philadelphia, Pa., a corporation of Delaware Application May 19, 1942, Serial No. 443,563

6 Claims. (Cl. 244—17)

This invention relates to rotative winged aircraft and is particularly concerned with an aircraft having a single sustaining rotor and further having propulsion means arranged in pusher fashion.

Generally, the invention is concerned with an improved arrangement and disposition of various elements of a machine of the type just mentioned, in order to achieve improvement in structure and operation from a number of standpoints.

Thus, a novel tail arrangement is provided, including improved structure for support of the tail surfaces to the rear of the pusher airscrew. According to the invention, certain tail supporting elements are employed not only to carry the tail surfaces, but also to carry alighting elements, such as landing wheels.

In accordance with another aspect of the invention, the several alighting elements are arranged in a novel manner, including disposition of the primary alighting elements well to the rear of the center of gravity of the aircraft and in a special relation to the engine and airscrew, with a view to providing good clearances between the rotor, airscrew and other parts of the machine, and also to avoid fouling of the pusher airscrew on the ground even when a landing is made with the nose relatively high in the air.

A further object of the invention is involved in a special relative location of rotor, engine airscrew, landing gear, occupants' seats and the like in a manner affording maximum visibility, particularly for an observer in a multi-place machine.

Improvement in performance characteristics is also contemplated, among which is here mentioned improvement in effecting take-off. With this in view, the aircraft of this invention incorporates a rotor adapted to develop a take-off thrust capable of effecting direct take-off, and further incorporates a propulsive airscrew having its axis inclined upwardly and forwardly so as to assist the direct take-off. The landing wheels are further arranged so as to provide a position of support at rest on the ground with said airscrew axis at the upwardly and forwardly inclined angle referred to, the rotor axis desirably being substantially vertical in this position.

The invention further has in view improving the stability characteristics of a pusher type rotative winged aircraft, as will further appear hereinafter.

How the foregoing and other objects and advantages are attained will be clear from the following description, referring to the accompanying drawings, in which—

Figure 1 is a side elevational view of an aircraft constructed in accordance with this invention;

Figure 2 is a top plan view of the aircraft of Figure 1;

Figure 3 is a front view of the same;

Figure 4 is an enlarged side view, partly in elevation and partly in vertical section; and Figure 5 is a horizontal sectional view through the forward portion of the body, illustrating the location of various parts.

As seen in Figures 1 and 2, the body 6 of the aircraft is relatively short in comparison with the overall length of the machine, the sustaining rotor 7 being mounted above the rear end of the body with its axis approximately vertical when the machine is at rest on the ground. The engine is mounted just to the rear of the body, within a cowling, as indicated at 8, this engine serving to drive the pusher airscrew 9. The empennage or tail 10 is carried to the rear of the airscrew by means of a pair of outriggers 11—11, the forward ends of which are connected with the outer ends of a pair of laterally projecting stubs 12—12. Stubs 12 further serve as supports for a pair of main landing wheels 13—13. A third landing wheel 14 is located below the forward portion of the body.

There are a number of important relationships involved in the elements briefly referred to above, but before considering these relationships and the advantages thereof, attention is directed to the following more detailed description of structure, for which purpose particular reference is now made to Figures 4 and 5.

The principal structural work of the body comprises a fabricated skeleton framework including longitudinal, transverse and bracing elements such as indicated at 15. This skeleton framework forms no part of the present invention per se, being described and claimed in copending application of John R. Huber, Serial No. 456,766, filed August 31, 1942.

The rotor is mounted above the rear end of the fuselage framing by means of a pylon which may include three legs 16 and 17—17. This pylon carries a support 18 in which a non-rotative hub spindle is mounted, the hub 19 being journaled on the spindle. The rotor blades 20 are pivotally connected with the hub 19, the pivots preferably including a flapping pivot, a drag pivot, and a mounting providing for pitch change of the blades. In addition, provision is made for controllably tilting the hub in all directions, so as to control the craft in pitch and roll. Push-pull members 21 and 22 may be used for this purpose, the former providing for longitudinal rotor tilting, and the latter for lateral tilting.

With respect to the features of the hub referred to just above, it may be mentioned that the details of the mechanism providing the functions mentioned form no part of the present invention per se. A hub, hub mounting and blade pivot arrangement suitable for the present purposes are fully disclosed in Larsen Patents 2,264,942 and 2,264,943, issued December 2, 1941.

It is to be kept in mind that, for certain purposes contemplated by this invention, the rotor shall be adapted to develop a thrust capable of effecting direct or substantially direct take-off. Although this requirement may be fulfilled by a rotor of the helicopter type adapted to be driven under all normal flight conditions, in the preferred arrangement the requirement in question is fulfilled by employment of a rotor adapted to be driven on the ground in preparation for take-off with the blades at low pitch, following which the rotor drive is disconnected and the blade pitch increased so as to convert kinetic energy stored in the rotor to lift. This latter type of operation is provided by the rotor and hub of said Larsen patents above mentioned. The relationship of this rotor characteristic to other features is brought out more fully hereinafter.

The engine 23 is mounted at the rear end of the body and serves to drive the pusher airscrew 9. In addition, the engine is employed to drive the rotor, the power being transmitted to the rotor through a manual clutch housed at 24 and actuable by a control connection 25 extending forwardly for access to the pilot. Shafting 26 extends forwardly from the delivery side of the clutch to the gearing housed at 27, from which upright shafting 28 carries the power to the rotor hub. Gearing (not shown) may be employed at the hub between shafting 28 and the hub itself, in accordance with the aforementioned Larsen patents. A rotor brake, indicated at 29, may be employed to retard rotation of the rotor after a landing has been made. An overrunning clutch is preferably included at an appropriate point between the rotor brake and the engine, so as to ensure free autorotation of the rotor in normal flight.

The engine cowling 8 cooperates in its action with the contour of the rear end of the fuselage, as indicated at 31, in order to provide adequate cooling. The hub of the airscrew is also desirably covered by a spinner 32.

An important consideration with respect to the mounting of the engine and airscrew may be observed upon careful examination of Figure 4. Thus, the axis of the airscrew is inclined upwardly and forwardly and passes through the center of gravity of the aircraft as a whole, indicated at c. g., this center also preferably being located slightly ahead of the axis of the rotor hub when the latter is in mid position on its tilting mounting.

Because of the arrangement just mentioned, when the aircraft is supported on the ground at rest in the position illustrated, the direct take-off effected by the rotor is assisted by virtue of upward and forward inclination of the airscrew axis. In accordance with the preferred method of take-off, the rotor is driven on the ground with the blades at low pitch (preferably zero pitch), as by actuating the manually controllable clutch 24 to connect the rotor drive. The rotor is then speeded up, preferably to a speed considerably in excess of the normal autorotative flight speed, whereupon the rotor drive clutch is disconnected and the blade pitch immediately increased and the engine throttle immediately opened wide, thereby effecting a jump take-off to a substantial height and quickly establishing a translational flight speed sufficient to avoid loss of altitude attained in the jump.

In connection with the above, it is now pointed out that the wheels 13—13 and 14 of the landing gear are arranged to provide a position of rest on the ground with the axis of airscrew 9 in the position mentioned.

The main landing wheels 13—13 are located well to the rear of the center of gravity of the aircraft and adjacent to the plane of rotation of the airscrew 9. In consequence, even when making a landing at a very steep ground angle, there is no danger of fouling of the airscrew on the ground. All three of the landing wheels are provided with shock struts 33—33 and 34. The strut 34 for the forward wheel is carried by the fuselage framing toward the forward end of the body, and this wheel is desirably arranged for free castering.

The two main landing wheels 13—13 are carried by the stubs 12—12, the shock struts 33—33 being secured to and depending from the outer ends of these stubs. As indicated in Figure 2, each of these stubs comprises primary structural elements such as tubing, together with cross bracing, the entire stub and the upper end of each shock strut 33 being enclosed by a fairing.

The stubs 12 are arranged at a positive dihedral angle and are of sufficient surface area to noticeably contribute to lateral stability. The stubs, moreover, are preferably swept-back as clearly appears in Figure 2, and both the dihedral and sweep-back angles are of importance not only for aerodynamic reasons, but also so as to bring the outer ends thereof into a position of particular advantage when considering the support of the tail. In this connection it is to be observed that the outer ends of the stubs are located approximately in a horizontal plane containing the center of the airscrew 9. The tail booms or outriggers 11 are connected with the outer ends of the stubs 12 and, therefore, extend rearwardly one at each side of the airscrew approximately in the plane containing the center of the airscrew.

Each outrigger 11 comprises a hollow stressed skin sheet metal tube having a cross sectional shape with a vertical dimension appreciably greater than the lateral dimension. Preferably also, the tube is tapered rearwardly, at least in the vertical dimension. In any event, the outrigger tubes support the tail in cantilever and are of sufficient depth to adequately care for vertical tail loads and transmit the same to the body.

A further advantage of this arrangement of outriggers is that, being of considerable depth, they provide appreciable vertical stabilizing surface. Moreover, when considering the lateral surface area of the outriggers, it is mentioned that for aerodynamic reasons it is of advantage that the outriggers are located relatively high. Examination of the drawings will show that the outriggers meet the landing gear stubs close to the horizontal plane containing the center of gravity of the aircraft.

The tail surfaces include a horizontal surface 35 having a pair of dihedral tips 36—36 for lateral stability. A vertical fin 37 is arranged centrally of the tail in the slipstream from the airscrew 9. A controllable rudder 38 trails the surface 37.

Rudder control cables (not shown) are desirably carried forward through the hollow outriggers 11, and in this connection it is pointed out that the arrangement of the outriggers and stubs 12 provides a convenient channel through which to bring the control cables forwardly and thence inwardly to the body ahead of the engine 23 and airscrew 9.

Turning now to the arrangement of the body, as appears in Figures 4 and 5, a pair of seats 39 and 40 is arranged in tandem. Seat 39 may desirably be employed for a pilot and seat 40 for an observer, the observer's seat being disposed well forwardly in the nose of the machine so as to give maximum visibility, as will further appear. Both of these seats are mounted on the fuselage framing 15, which framing, as more fully disclosed in copending application of John R. Huber, Serial No. 456,766, above mentioned, is of considerable overall vertical dimension in the region of the rotor supporting pylon 16—17 but is of reduced vertical dimension toward the forward end of the body, the forwardmost portion of the framing constituting, in effect, a "shelf" on which the observer's seat 40 is carried.

The line indicated at 41 on Figures 1 and 4 represents a diagonal extending generally from a forward lower portion of the body to an upper rear portion thereof, behind and below which diagonal the main fuselage skeleton 15 is located, there being a primary diagonal structural member at each side. Above and forwardly of this diagonal the framing 42 preferably constitutes substantially no more than is required for the purpose of carrying transparent (such as Plexiglass) windows 43.

As clearly appears in Figure 1, the body of the fuselage below and to the rear of the diagonal 41 is covered with opaque surfacing material 44, such as metal sheeting or fabric.

From inspection of Figures 2 and 3 it will be seen that the windows 43 are extended not only around the nose of the fuselage, but also over the top thereof, even to a point back under the rotor supporting pylon 16—17.

In accordance with the foregoing, an unusual degree of visibility is afforded not only for the observer, but even for the pilot, and this notwithstanding the fact that the pilot's and observer's seats are arranged in tandem, with the pilot's seat behind the observer's.

The machine preferably is equipped for dual control, for which purpose pilot's and observer's control sticks 45 and 46 are provided, the latter being removable. These control sticks are coupled with rock shafts 47 and 48, from which lateral control movements are transmitted to the tiltable hub 19 for lateral tilting thereof as by push-pull tube 49 and the supplemental rock shaft 50, which latter is coupled with the control tube 22 above referred to. Fore and aft movement of the control sticks 45 and 46 is transmitted to the longitudinal control tube 21 by means of a bell crank 51.

Other controls are preferably duplicated for the two seats, including the controls indicated at 52 and 52a, which are desirably coupled with the engine throttle 53 and also with the controllable clutch 24 for driving the rotor. These controls may be of the type more fully disclosed in copending application of Agnew E. Larsen, Serial No. 363,593, filed October 31, 1940 (which issued on July 20, 1943, as Patent No. 2,324,588), the controls preferably providing for interrelated operation of the rotor clutch and of the pitch change mechanism for the blades, in order to effect jump take-off as above referred to.

With reference to the general arrangement of the body, it is further observed that the fuel and oil tanks 54 and 55 are located one above the other generally along a line close to parallelism with the rotor axis. Variation in loading of these tanks, therefore, does not appreciably alter the longitudinal balance of the machine.

I claim:

1. In an aircraft having a body and a sustaining rotor thereabove, an engine mounted at the rear end of said body, a pylon mounting the rotor above the rear end of the body and consisting of three pylon legs, one of which extends downwardly from adjacent the rotor center to a point of connection with the body adjacent the mounting of the engine, and the other two of which extend downwardly and forwardly in divergent relation, and a largely transparently-walled enclosed cabin extending centrally forwardly from between said forward pylon legs.

2. In an aircraft having a body and a sustaining rotor thereabove, an engine mounted at the rear end of said body, a pylon mounting the rotor above the rear end of the body and consisting of three pylon legs, one of which extends downwardly from adjacent the rotor center to a point of connection with the body adjacent the mounting of the engine, and the other two of which extend downwardly and forwardly in divergent relation, a largely transparently-walled enclosed cabin extending centrally forwardly from between said forward pylon legs, and boom means extending to a position rearwardly of said engine and carrying directional control means substantially rearwardly of said body.

3. In an aircraft having a body, a superimposed sustaining rotor adapted to develop a lifting force capable of effecting direct take-off and comprising elongated aeroform blades rotatable about an approximately upright axis and mounted for movement transversely of their rotative path, and an airscrew rotatable on an axis which extends generally longitudinally of the craft and which axis, when viewing the craft in side elevation, lies close to the center of gravity of the craft and at its upper side forms an acute angle with the rotor axis forwardly of the latter.

4. In an aircraft having a body, a sustaining rotor thereabove adapted to lift the machine substantially vertically, and a propulsive airscrew, means mounting the rotor and airscrew in such relationship that with the rotor axis vertical the airscrew axis is inclined upwardly at its forward end, said airscrew axis being further so located that the transverse plane containing the upwardly inclined airscrew axis contains or passes close to the mean position of the center of gravity of the craft, and alighting gear for the craft providing a stable position of rest therefor with the rotor and airscrew axes disposed as above mentioned.

5. In an aircraft having a body, a sustaining rotor thereabove adapted to lift the machine substantially vertically, and a propulsive airscrew, means mounting the rotor and airscrew in such relationship that with the rotor axis vertical the airscrew axis is inclined upwardly at its forward end, said airscrew axis being further so located that the transverse plane containing the upwardly inclined airscrew axis contains or passes close to the mean position of the center of gravity of the craft, alighting gear for the craft providing a stable position of rest therefor with the rotor and airscrew axes disposed as above mentioned, and controllable means for effecting variable inclination of the rotor lift thrust relative to the vertical, whereby to control the craft in vertical take-off from said stable position of rest.

6. An aircraft having a sustaining rotor adapted to develop a lifting force capable of effecting direct take-off, and a propulsive airscrew arranged in pusher fashion, with its axis extending longitudinally and lying in a transverse plane containing and inclined downwardly and rearwardly of the center of gravity of the aircraft.

PAUL H. STANLEY.